(12) United States Patent
Sands et al.

(10) Patent No.: US 7,871,455 B1
(45) Date of Patent: Jan. 18, 2011

(54) JET ENGINE PROTECTION SYSTEM

(75) Inventors: Fred Charles Sands, Los Angeles, CA (US); Milton D. Jantzen, Pismo Beach, CA (US)

(73) Assignee: Vintage Capital Group, LLC, Los Angeles, CA (US)

(*) Notice: Subject to any disclaimer, the term of this patent is extended or adjusted under 35 U.S.C. 154(b) by 0 days.

(21) Appl. No.: 12/814,074

(22) Filed: Jun. 11, 2010

Related U.S. Application Data

(60) Provisional application No. 61/218,825, filed on Jun. 19, 2009.

(51) Int. Cl.
*B01D 46/46* (2006.01)
(52) U.S. Cl. .................. 95/1; 95/267; 95/273; 96/417; 96/397; 55/306; 55/422; 244/53 R; 244/53 B; 244/54
(58) Field of Classification Search ............. 55/306; 95/1, 267, 273; 96/417, 397; 244/53 R, 244/53 B, 54
See application file for complete search history.

(56) References Cited

U.S. PATENT DOCUMENTS

| | | | |
|---|---|---|---|
| 2,507,018 A | | 5/1950 | Jewett et al. |
| 2,534,138 A | | 12/1950 | Marshall |
| 2,546,153 A | | 3/1951 | De Remer |
| 2,618,358 A | | 11/1952 | Newcomb |
| 2,623,610 A | | 12/1952 | Buechel |
| 2,663,993 A | | 12/1953 | Mosser |
| 2,680,345 A | | 6/1954 | Frost |
| 2,704,136 A | * | 3/1955 | Rainbow ............... 55/306 |
| 2,812,036 A | * | 11/1957 | Hopper ................ 55/306 |
| 2,812,898 A | * | 11/1957 | Buell ................... 244/53 R |

(Continued)

FOREIGN PATENT DOCUMENTS

DE        19545806 A1 *  8/1996

(Continued)

OTHER PUBLICATIONS

ACE Inventions & Software—IBSPS—Integrated Bird-Aircraft Strike Prevention System, 2 pages, Internet Publication, Jun. 8, 2010.

*Primary Examiner*—Jason M Greene
*Assistant Examiner*—Dung Bui
(74) *Attorney, Agent, or Firm*—Jon Hokanson; Lewis Brisbois Bisgaard & Smith LLP

(57) ABSTRACT

A modern jet engine inlet protection system that protects against large birds and operates autonomously, that is dormant in routine aircraft operations, that automatically actuates its protective device(s) only at the immediate point of need, then returning it (them) to a non-interfering position, including a RADAR system and a LIDAR system which detect birds entering the intended flight path of the aircraft, and fast computer-implemented computational algorithms that track and identify those from the detected set that are (1) projected to enter a zone which would lead to ingestion by the engine, and (2) of a size large enough that they would seriously damage the engine if ingested; that includes defensive mechanisms housed in the engine nacelle cowling or center hub, or in the fuselage structure that are instantaneously actuated shortly before arriving at the point of impact to shield, deflect, reduce the size of the approaching bird to an acceptable mass, or destroy it, and, that after the ingestion threat has passed, the devices are stowed/retracted or safely jettisoned.

4 Claims, 12 Drawing Sheets

U.S. PATENT DOCUMENTS

| | | | |
|---|---|---|---|
| 2,928,497 A * | 3/1960 | Stockdale | 55/306 |
| 2,931,460 A | 4/1960 | McEachern | |
| 2,944,631 A * | 7/1960 | Kerry et al. | 55/306 |
| 2,969,941 A | 1/1961 | Hobart, Jr. | |
| 3,121,545 A * | 2/1964 | Meletion | 244/53 B |
| 3,196,598 A | 7/1965 | Olson | |
| 3,338,049 A * | 8/1967 | Fernberger | 60/39.092 |
| 3,426,981 A | 2/1969 | Allcock | |
| 3,537,240 A | 11/1970 | Weidinger et al. | |
| 3,616,616 A * | 11/1971 | Flatt | 55/306 |
| 3,715,717 A * | 2/1973 | Perkinson | 340/961 |
| 3,871,844 A | 3/1975 | Calvin, Sr. | |
| 3,905,566 A | 9/1975 | Anderson | |
| 3,998,048 A * | 12/1976 | Derue | 60/39.092 |
| 4,149,689 A | 4/1979 | McDonald | |
| 4,261,168 A * | 4/1981 | Grigorian et al. | 60/39.092 |
| 4,351,150 A * | 9/1982 | Schulze | 60/226.1 |
| 4,354,346 A * | 10/1982 | Wooding | 60/39.092 |
| 4,397,431 A * | 8/1983 | Ben-Porat | 244/53 B |
| 4,531,694 A * | 7/1985 | Soloy | 244/54 |
| 4,617,028 A * | 10/1986 | Ray et al. | 95/267 |
| 4,736,907 A | 4/1988 | Steffen | |
| 4,760,978 A | 8/1988 | Schuyler et al. | |
| 4,964,331 A * | 10/1990 | Halevy et al. | 89/37.19 |
| 5,134,410 A | 7/1992 | Shrader | |
| 5,179,581 A * | 1/1993 | Annis | 378/57 |
| 5,411,224 A * | 5/1995 | Dearman et al. | 244/53 B |
| 5,522,566 A | 6/1996 | Hardy et al. | |
| 5,779,169 A | 7/1998 | Sloan | |
| 5,828,334 A * | 10/1998 | Deegan | 342/90 |
| 6,089,824 A | 7/2000 | Soares | |
| 6,138,950 A | 10/2000 | Wainfan et al. | |
| 6,536,202 B2 | 3/2003 | Lo | |
| 6,872,232 B1 | 3/2005 | Pavlatos | |
| 6,883,751 B2 | 4/2005 | Koncsek | |
| 7,160,345 B2 | 1/2007 | Pavlatos | |
| 7,222,002 B2 * | 5/2007 | Maine | 701/3 |
| 7,251,888 B2 * | 8/2007 | Schreiber | 29/889.72 |
| 7,370,836 B2 * | 5/2008 | Greene | 244/195 |
| 7,422,611 B2 | 9/2008 | Pavlatos | |
| 7,494,522 B2 | 2/2009 | Pavlatos | |
| 7,575,014 B2 * | 8/2009 | Stelzer | 137/15.1 |
| 7,631,836 B2 * | 12/2009 | Lebas | 244/53 B |
| 7,803,204 B1 * | 9/2010 | Mladinich | 55/306 |
| 2003/0174504 A1 * | 9/2003 | Tamaoki | 362/470 |
| 2004/0195437 A1 * | 10/2004 | Garric | 244/53 B |
| 2004/0211167 A1 * | 10/2004 | Schreiber | 60/226.1 |
| 2004/0249520 A1 * | 12/2004 | Maine | 701/3 |
| 2006/0125701 A1 | 6/2006 | Rotta | |
| 2006/0238411 A1 * | 10/2006 | Fullerton et al. | 342/147 |
| 2006/0246237 A1 * | 11/2006 | Colson | 428/28 |
| 2007/0034071 A1 * | 2/2007 | Greene | 89/1.11 |
| 2009/0016872 A1 * | 1/2009 | Anghileri | 415/121.2 |
| 2009/0101760 A1 * | 4/2009 | Ghogomu | 244/53 R |
| 2009/0139200 A1 | 6/2009 | Colaprisco | |
| 2010/0003121 A1 * | 1/2010 | Berryann et al. | 415/1 |
| 2010/0094485 A1 * | 4/2010 | Verlut et al. | 701/3 |
| 2010/0175558 A1 | 7/2010 | Raje | |
| 2010/0192834 A1 * | 8/2010 | Fogiel | 116/22 A |

FOREIGN PATENT DOCUMENTS

| | | | |
|---|---|---|---|
| JP | 11278396 A * | 10/1999 | |
| WO | WO 01/12506 A1 | 2/2001 | |

* cited by examiner

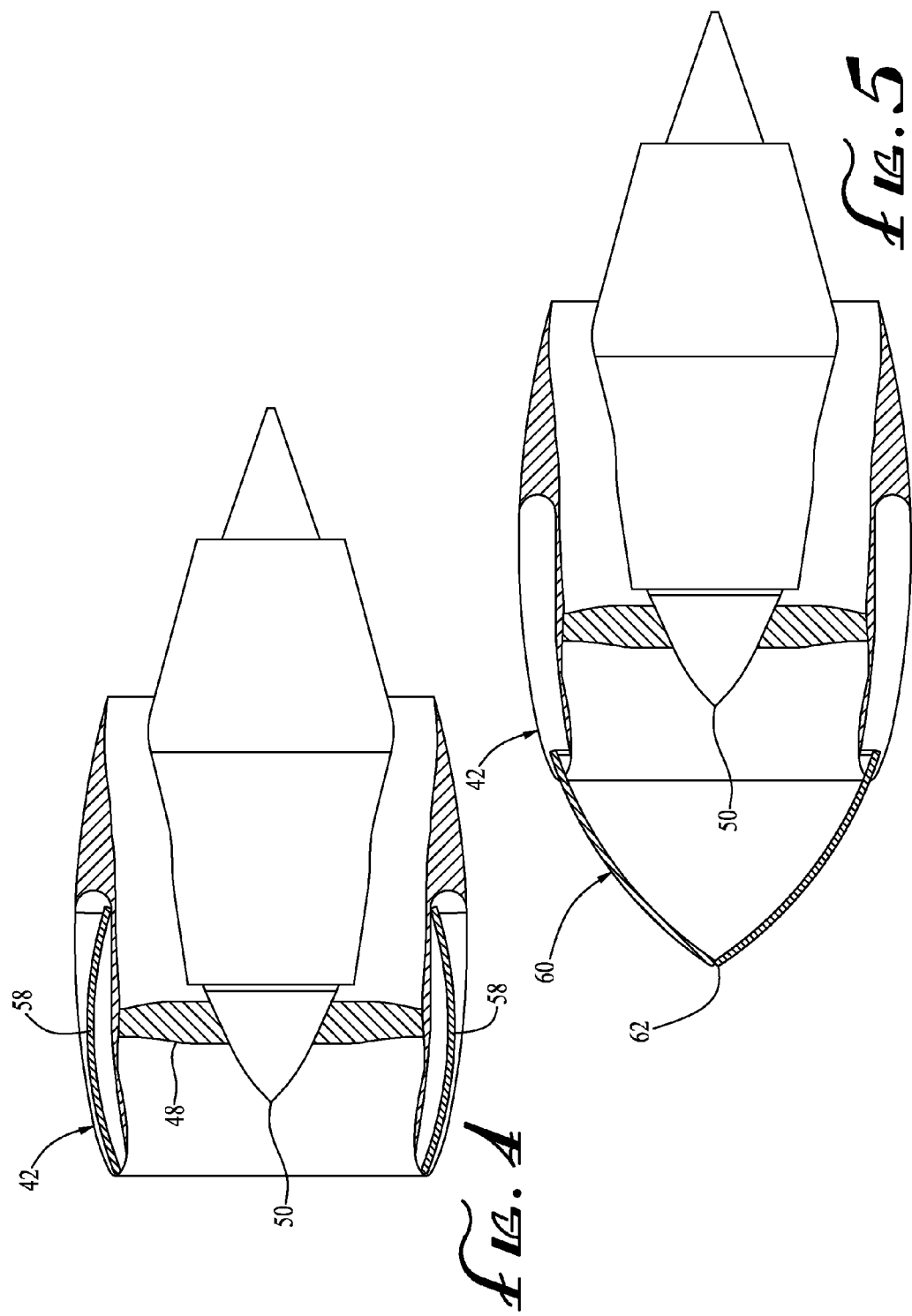

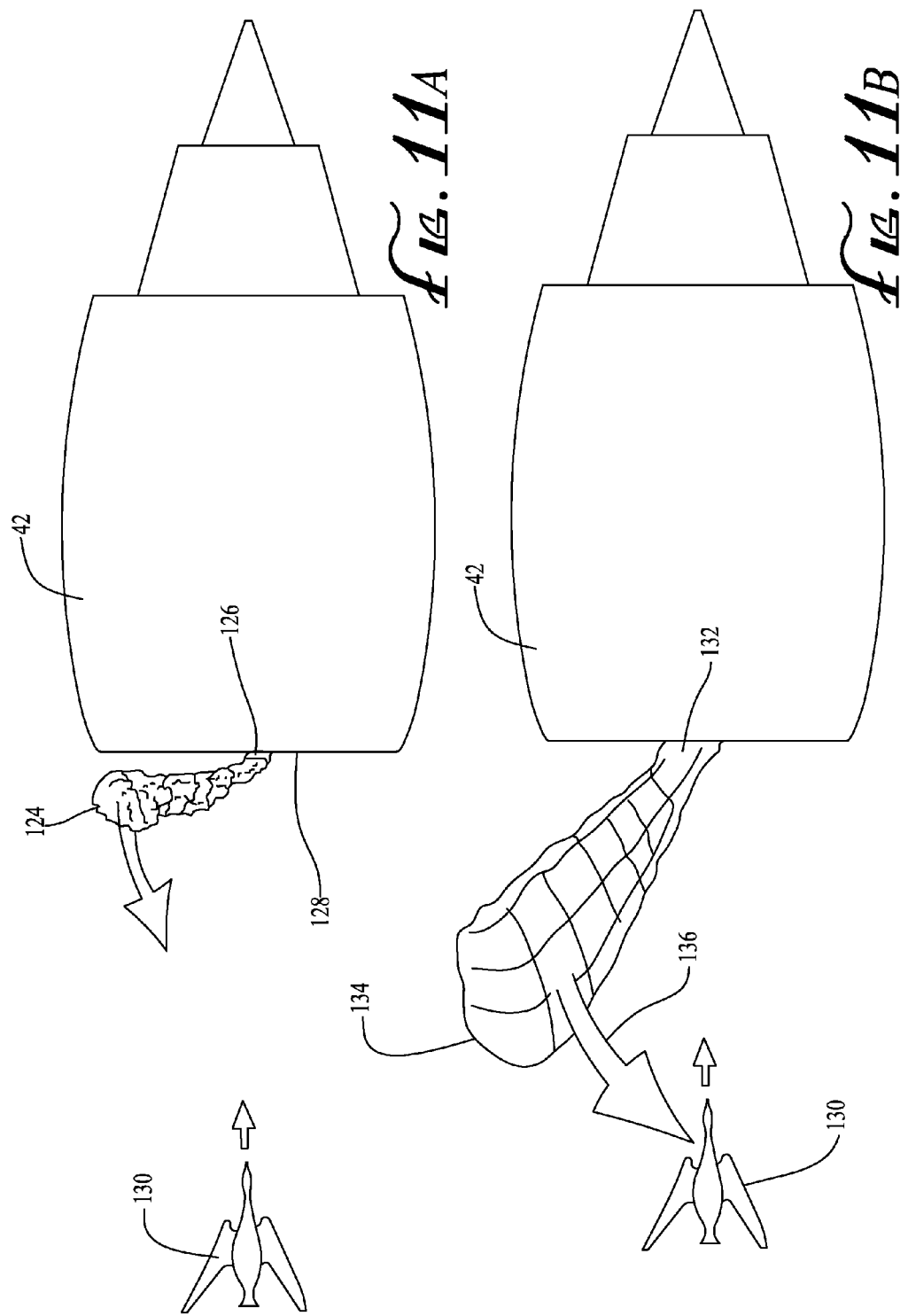

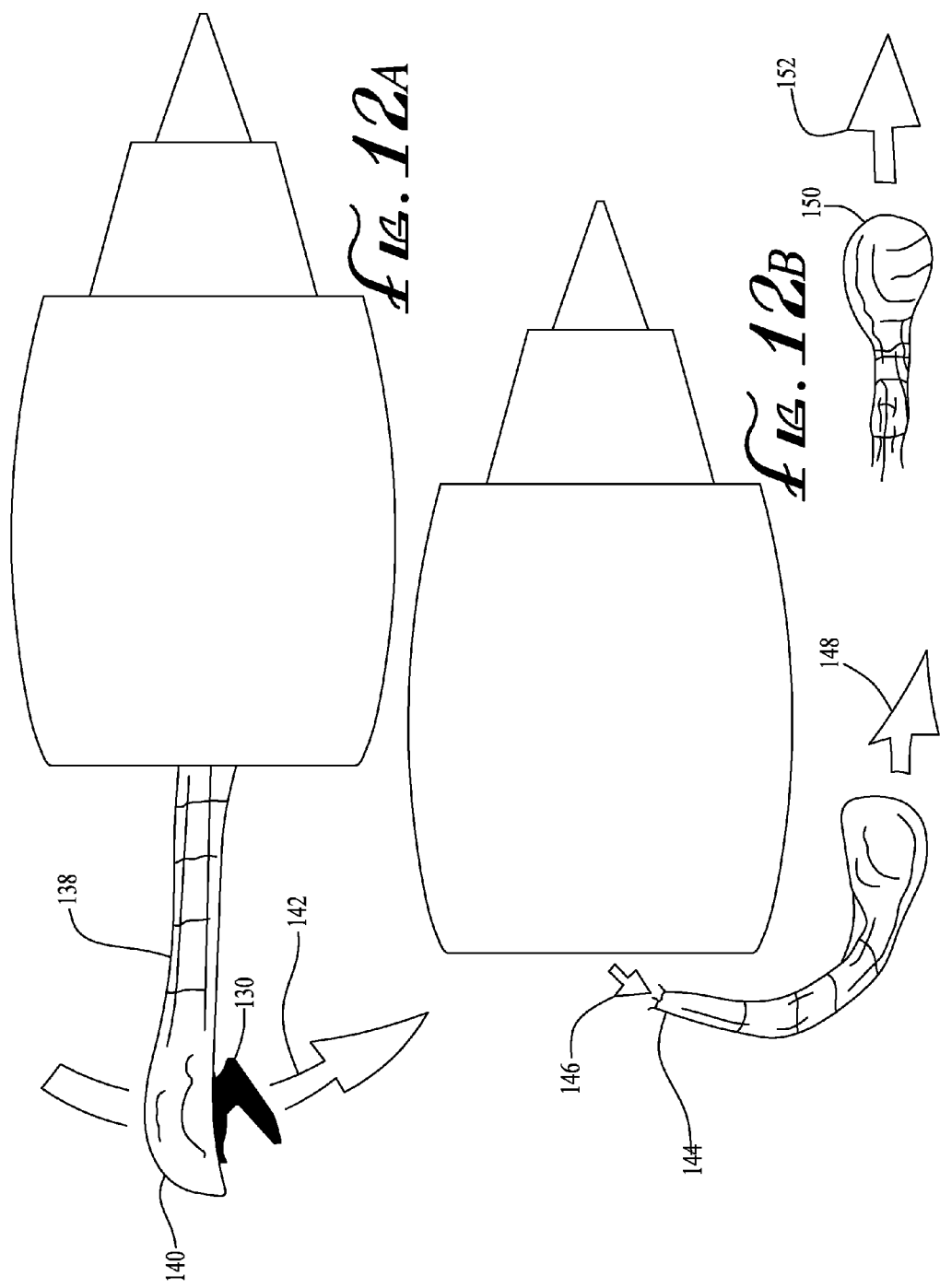

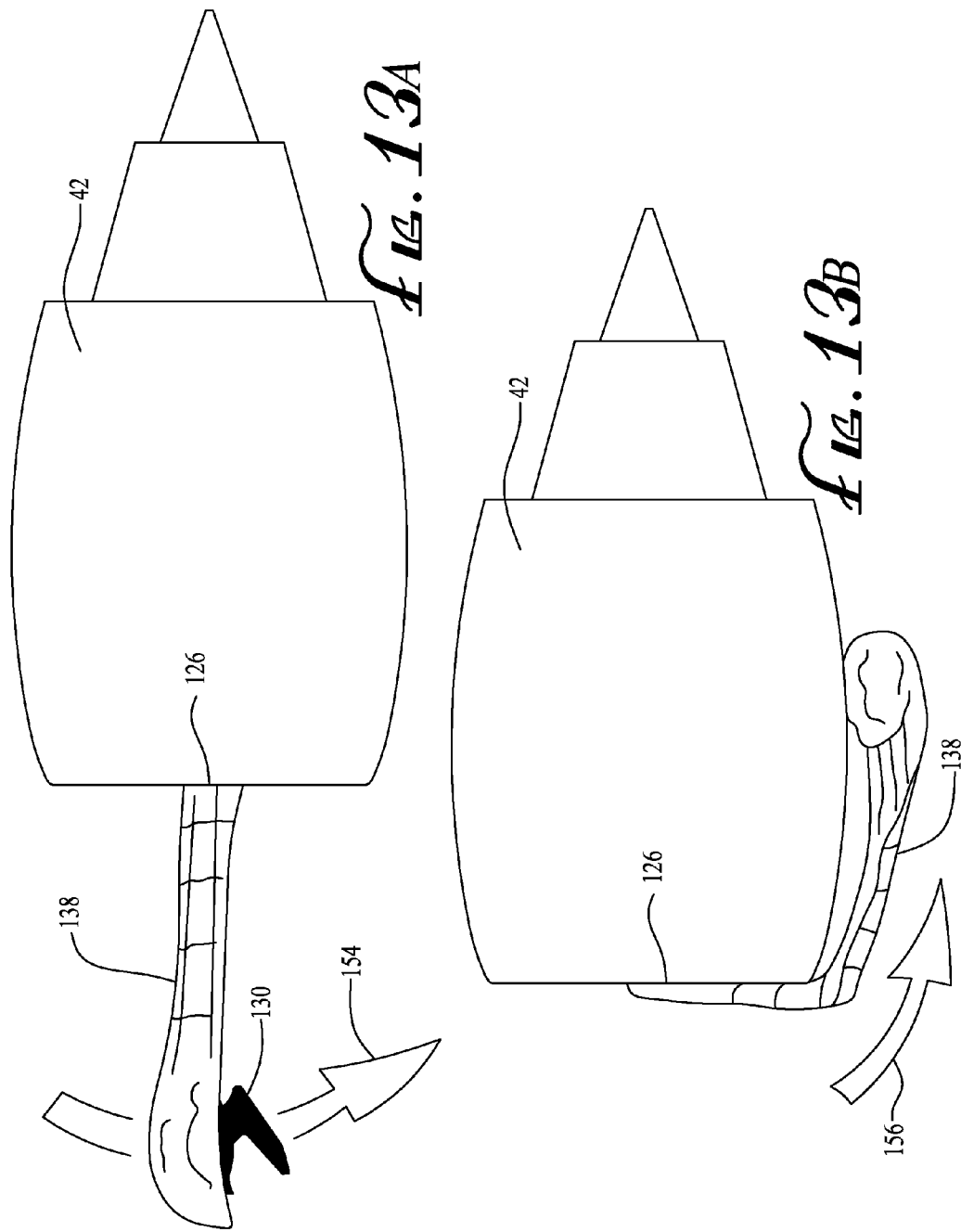

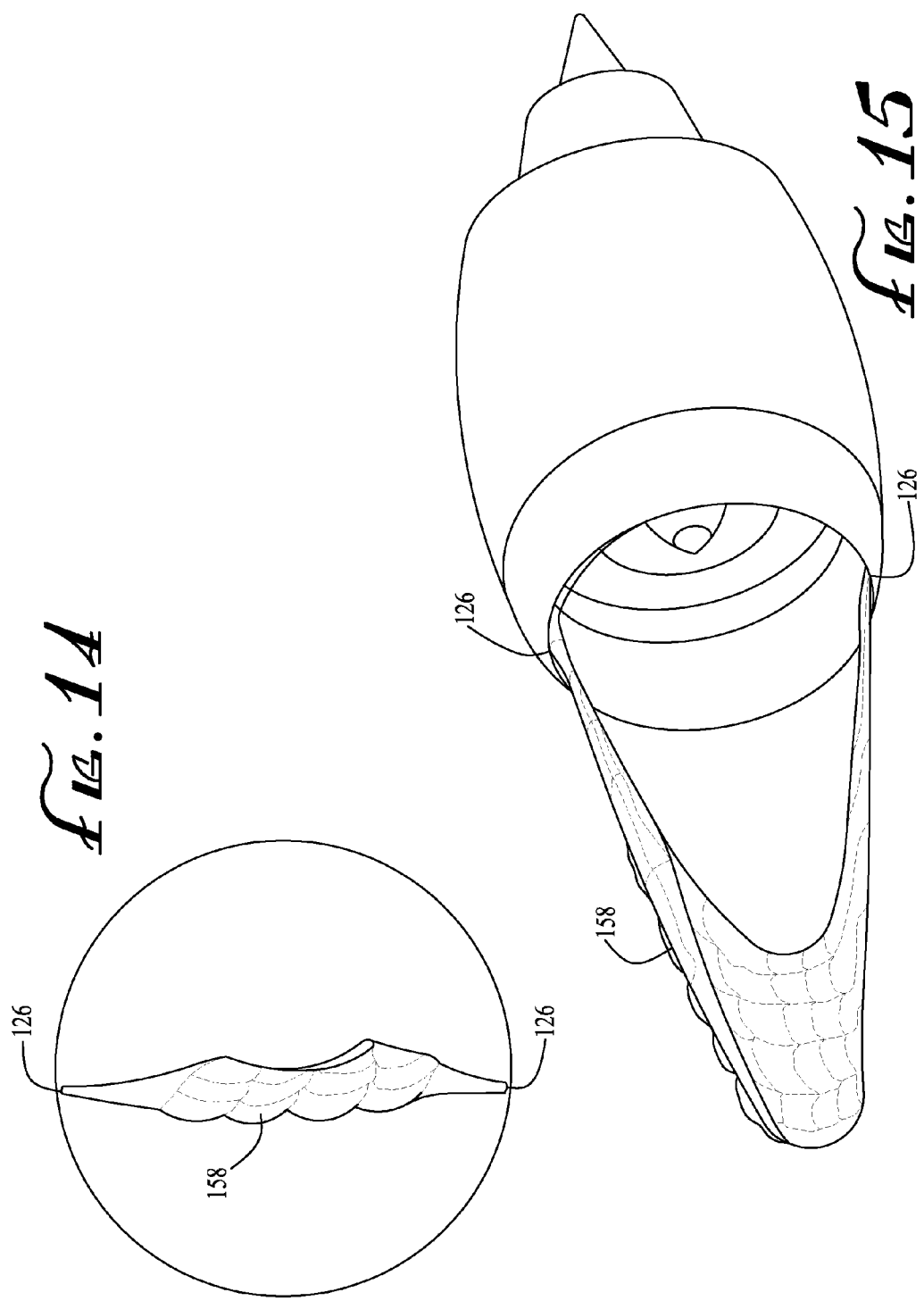

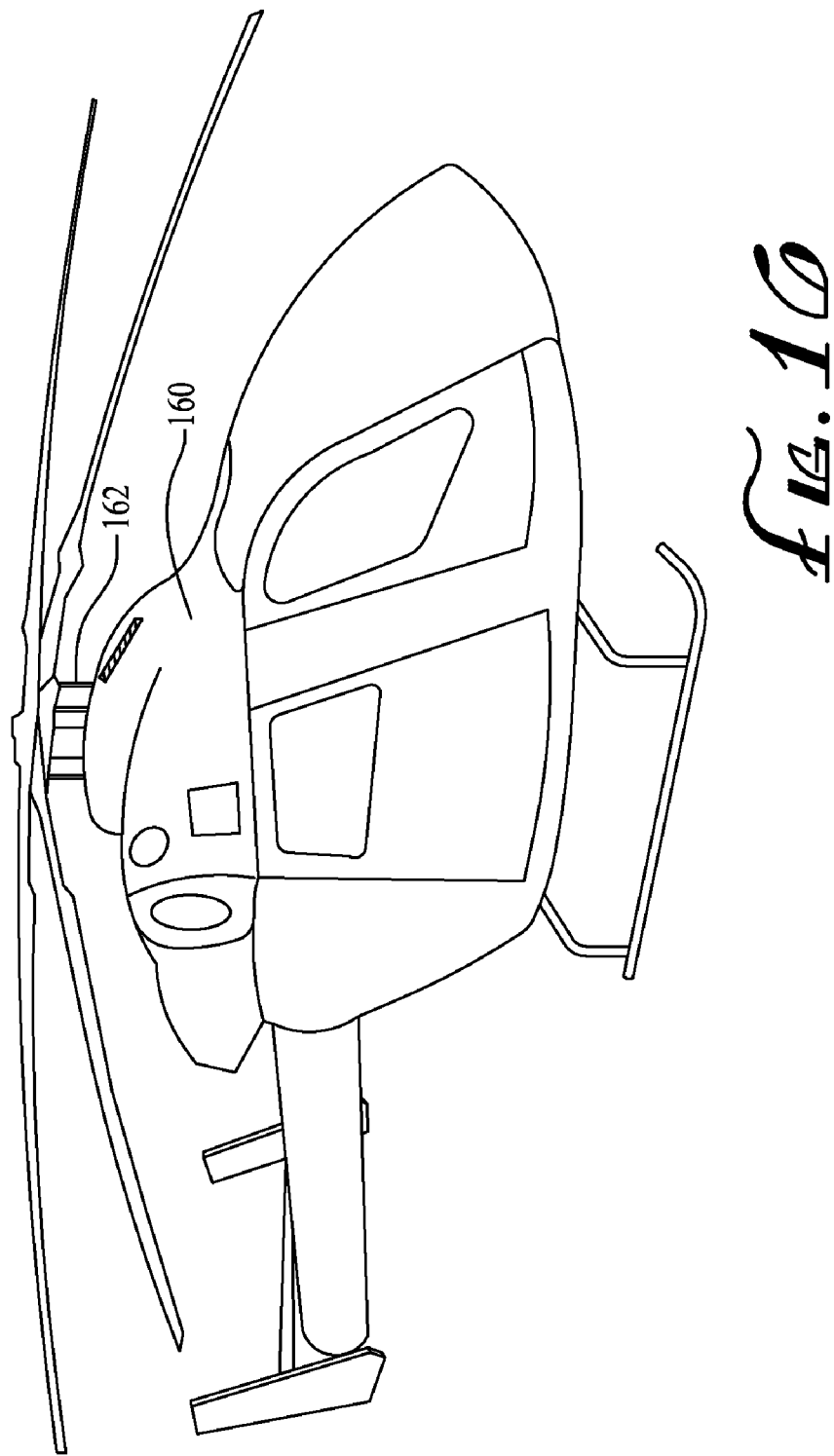

JET ENGINE PROTECTION SYSTEM

CROSS REFERENCE TO RELATED APPLICATION

This application claims the benefit of U.S. provisional patent application 61/218,825, filed Jun. 19, 2009, the entirety of which is incorporated by reference herein.

FIELD OF INVENTION

The invention relates generally to systems and methods for protecting jet engines from ingestion of foreign objects, such as large birds, during flight and an alternative embodiment specifically adapted for protection of a vulnerable region of helicopters. More particularly the systems relate to mechanical devices that function to mitigate the risk of bird strikes to aircraft engines.

BACKGROUND

There are many known systems and devices intended to protect jet engines in general, and those on aircraft in specific. Nearly all employ some type of shield in front of the inlet, and they have taken various forms and use a variety of means. As in many fields of endeavor, successive developments are made but subsequently are found lacking as new understandings and problems arise out of often unintended consequences. A review of patents directed to such systems and devices confirms this, and also shows that one specific issue dominates. One central problem in this field involves failed attempts to avoid a significant reduction in airflow that arises from the specific system or device being made. Several such designs claim to have solved this problem, but each of the proposed solutions brought with it some further complication, e.g., if a retractable shield was presented as the solution, the shield and related mechanisms became prohibitively complex and heavy.

Also, it is apparent that several of these prior attempted solutions were based on premises that either no longer apply or were flawed. One such assumption, used by certain designs, is that bird strikes occur only in that portion of the flight at or when approaching an airport. While it is true that a large percentage of recent bird strikes have occurred there, a system designed to operate only in this flight region leaves the aircraft vulnerable to bird strikes that can and do occur in all phases of flight, including at high altitude. Publicly available data show damage to aircraft from routine encounters with birds at flight altitudes of 10,000 feet and well above.

None of these known systems has found its way into practical application. Also, nearly all are limited in application because they have potential use only for an older type of aircraft jet engine—the turbojet. Few relate to the situation and circumstances presented by the newer engine design now widely in use on commercial aircraft—the high-bypass ratio turbofan—and those few contain significant problems yet to be successfully addressed.

Since the time of the earliest patents in this field, inventors have envisioned affixing some type of metal screening structure in front of the engine intake for the general purpose of preventing the ingestion of debris. However, the preponderance of patents specifying this type of screen device recognizes that it causes problems. For example, U.S. Pat. No. 2,507,018, dating from 1950—only just over 10 years after the first jet engine flew—was an annular inlet screen, inside the inlet duct, sloping forward from nacelle cowling to center hub, and made of aerodynamically shaped metal slats attached to aerodynamically shaped struts. This entire apparatus was to be electrically heated in an attempt to deal with ice buildup on the struts. Several patents followed that provided alterations on the type and/or placement of the metal screen system, and all dealt with the need for anti-icing.

To operate as designed, a jet engine needs to have a large quantity of air flowing into the inlet, with the flow essentially undisturbed by any object encountered prior to entering the inlet. A problem not addressed by some early designs and that they created or contributed to was a significant reduction in airflow caused by the blockage of the inlet by the metal system. Later designs attempted various techniques to address this problem. For example, U.S. Pat. Nos. 3,196,598; 3,871,844; 4,149,689; and 5,411,224 each address this problem with techniques such as placing the screen in front of the inlet and making it a very large oval- or cone-shaped apparatus when viewed from the side, and shaping the screen material into a sort of airfoil cross-section, with the intent of reducing inlet blockage.

Other designs proposed using a screen having movable members, allowing the screen to be in a sort of retracted mode for what was considered non-hazardous portions of the flight. However, such designs presented several problems, including very complex mechanisms needed for movement between their stored and operational states. Also, although birds are more likely to be encountered by aircraft during the lower altitude flight departing or arriving at an airport, there have been many damaging bird strikes in other flight regimes, and those designs do not provide aircraft engine protection throughout the entire flight envelope.

Three recent patent publications mention the modern turbofan jet engine or show a configuration on what is possibly a variant of a modern jet engine. U.S. Pat. No. 6,089,824 proposes a solution that instead of placing a screen across the inlet to prevent bird ingestion; a cone-shaped, spinning cutter is attached to the rotating engine shaft out in front of the inlet, and is intended to dismember incoming birds. U.S. Pat. No. 6,138,950 describes a concept resembling that originally employed in the 1970s on one military aircraft—the Lockheed F-117A "Stealth Fighter". In this implementation the inlet is covered with a thick plate that forms a porous grid including a set of adjoining tubes. Several different aircraft are shown with the device, including one installation on what resembles a turbofan engine. International patent publication WO/2001/012506 describes a device that includes elements which can move between a first, inactive position in which the air inlet is substantially open; and a second, active position in which the elements form the protection in front of the inlet opening.

Also, U.S. Pat. No. 7,494,522, corresponding to International patent publication WO/2007/0245697 describes numerous designs, all of which involve screens that are mostly inside the engine itself and attached to a rotating pole.

Bird strikes are becoming more frequent, though mainly they have not caused catastrophic loss of aircraft and lives. The recent loss of a commercial aircraft to bird ingestion—although amazingly all the passengers survived—has brought into sharp focus the reality of the massive increase in bird populations around the world, and especially in the continental United States. Experts in the field have stated prior to the accident referred to, that they had expected to lose aircraft to bird strikes. What they did not expect was that anyone would survive—much less the entire complement of occupants. Predictions are that bird populations will continue to increase. Along with this has been an increase in the mass (weight) of the birds and thus a higher percentage of such birds being involved in bird strikes. All modern jet engines are designed to U.S. Federal Aviation Agency-mandated requirements that specify the type of continued operation after ingesting a bird of specified size, at a specified aircraft speed. Modern jet engines have demonstrated the ability to achieve these specified requirements in test environments. However, a real problem exists in that in actual, non-test conditions birds that collide with jet engines have at times weighed more than what the FAA-mandated weight requirement specifies. While jet engine manufacturers have been able to occasionally demonstrate in tests successful handling of a collision with a somewhat heavier bird than the FAA requirement, such tests have not been consistently successful. As a result, large, heavy birds currently pose an unmanageable threat to commercial aviation safety.

Finally, turning to the modern turbofan jet engine, it is distinguished by its very large inlet, far beyond the dimensions of the turbojet engine, for which nearly all of the earlier jet engine protection designs were directed. The very size of this inlet challenges, if not renders useless virtually all of these previously known engine protection designs. Of those few that were intended for possible use on a turbofan jet engine, the inventors expressed concern about the crucial need to avoid reducing engine performance. While attempts were made to satisfy this objective, e.g. by having the engine protection system remaining completely imbedded within existing structure until ordered into play by some pilot action, none was designed to be completely autonomous. Also, none was designed to operate in fractions of a second, none was able to determine the need for actuation based on accurately assessing the mass of the approaching bird, none employed bird-shielding, deflecting, or destructive mechanisms and none addressed protection of the central region of the engine inlet, rather than the entire fan area, to prevent the ingested bird from travelling into the core of the engine. It is the engine core that is susceptible to complete and unrecoverable engine failure from such ingestion. All these problems and concerns are addressed in the systems and methods described herein.

SUMMARY

The engine protection system, for which multiple embodiments are described herein, in its stored mode does not degrade aircraft performance, deploys only when needed and is actuated in a timely fashion in response to information it gathers about oncoming threats, primarily birds. They provide protective guards for jet aircraft engines, and improved methods for detecting, identifying, tracking, and predicting the likelihood of collision with a protected engine by bird(s) of a size determined to require protecting against impact; determining the necessity of deploying the guard(s) against such bird(s) as opposed to maneuvering the airplane to avoid the bird entirely; actuating and deploying the protecting device(s), if it is determined to do so, in sufficient time to avert or deflect impact with the engine; and for retracting or safely disposing the device(s); all involving, but not limited to, the modern high-bypass ratio turbofan jet engine, and to protecting the exposed, vulnerable components of a helicopter rotor control system against the specific threats listed above. In alternate embodiments they provide for automatically protecting the air intake of a modern high-bypass ratio turbofan engine from the ingestion of birds and other foreign objects. The preferred system is preferably housed in the nacelle cowling or center hub of the turbine engine or fuselage structure which, on actuation, expands to momentarily shield, deflect, reduce the size of the approaching bird or other foreign objects to an acceptable mass. Actuation is preferably commanded automatically, without requiring human decision or action, by a sub-system comprised of a sensor which detects birds or other object entering the intended flight path of the aircraft; fast computational algorithms that track and identify those from the detected set that are projected to enter a zone which would lead to ingestion by the engine, and of a size or weight large enough to seriously damage the engine if ingested. After the ingestion threat has been disposed of, components of the system are stowed, retracted or safely jettisoned. The present systems provide alternative embodiments for dealing with large birds and also protecting the core engine region of the inlet. The present systems thus prevent certain foreign objects from entering the air intake of a jet turbine engine. Finally, the systems also include an alternative embodiment that is specifically useful for and adapted to protection of a vulnerable region on helicopters.

The systems relate to protective guards for jet aircraft engines, specifically to improved methods for detecting, identifying, tracking, and predicting the likelihood of collision with a protected engine by bird(s) of a size determined to require protecting against impact; determining the necessity of deploying the guard(s) against such bird(s); actuating the protecting device(s) in sufficient time to avert or deflect impact with the engine; and for its retraction or safe disposal; all involving, but not limited to, the modern high-bypass ratio turbofan jet engine, and to protection of the exposed, vulnerable components of a helicopter rotor control system, against the specific threats listed above.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein:

FIG. 4 is a simplified cross-sectional schematic view of a turbofan jet engine with a preferred mechanical embodiment defensive system installed in its stowed or retracted position inside the engine nacelle;

FIG. 5 is a simplified cross-sectional view of the FIG. 4 embodiment depicting the defensive system in an active or extended position;

FIGS. 11A and 11B are schematic representations of an alternate embodiment, dynamic inflatable or morphing bag or device showing two stages of its deployment: a stage immediately after release from the nacelle (11A) and a stage in mid-deployment (11B);

FIGS. 12A and 12B are schematic representation of the FIGS. 11A and 11B embodiment depicting two stages during one possible post-capture scenario, after the bird has been captured by the device (12A), and in which the device is jettisoned (12B);

FIGS. 13A and 13B are schematic representations of two stages during operation of an alternate embodiment depicting a bag as shown in FIGS. 11A and 11B, but with an alternate structure for a post-capture scenario in which the device is retained (13A) and held next to the nacelle (13B);

FIG. 14 is a front view of the FIGS. 11A and 11B embodiment seen during its mid-deployment stage;

FIG. 15 is an isometric view of the FIGS. 11A and 11B embodiment seen during its mid-deployment stage.

FIG. 16 is a schematic representation of a helicopter, illustrating the location of the blade control mechanism;

Figure 1:
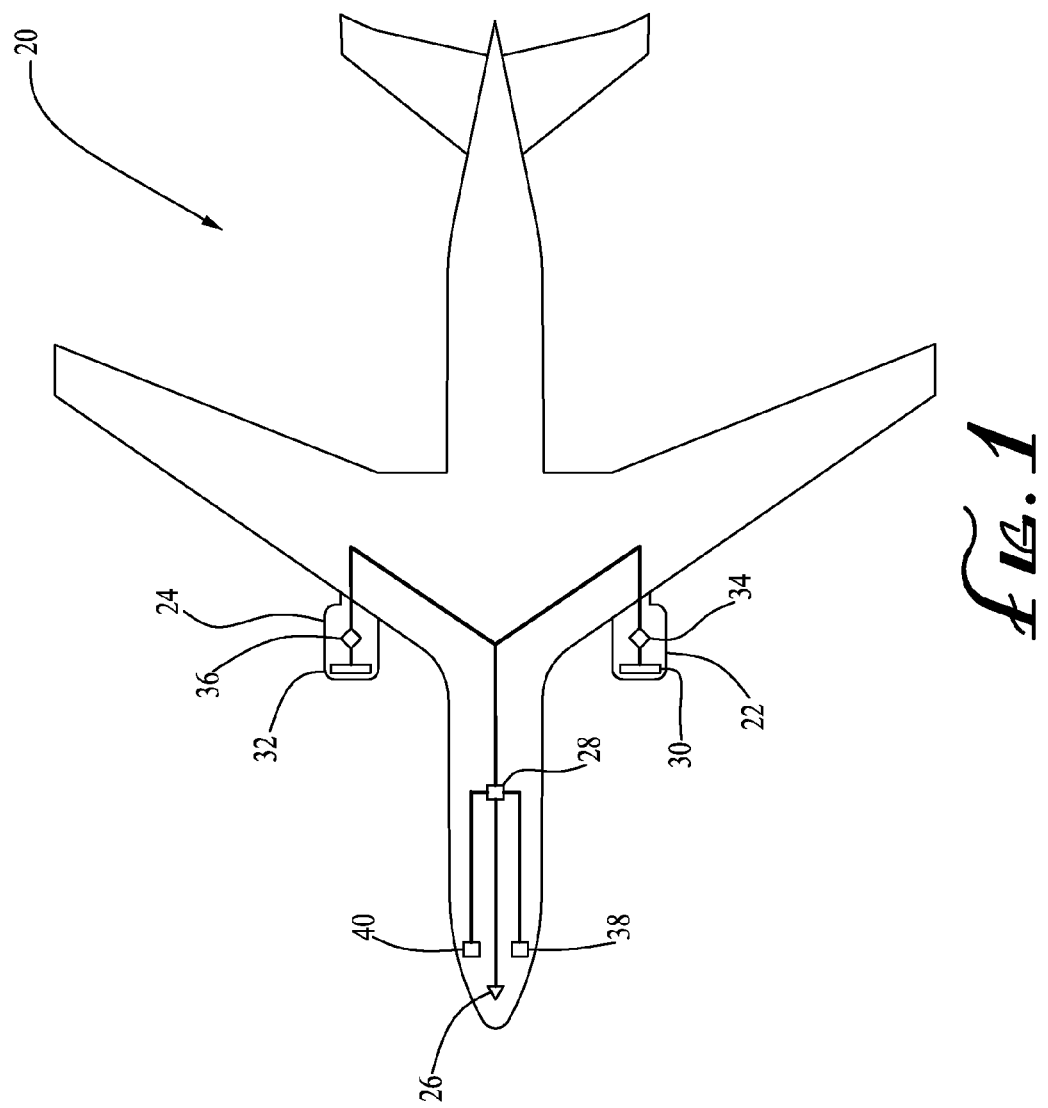
FIG. 1 is a simplified schematic depicting the distributed components of several embodiments of a preferred jet engine protection system.

Reference symbols or names are used in the figures to indicate certain components, aspects or features shown therein. Reference symbols common to more than one figure indicate like components, aspects or features shown therein.

DETAILED DESCRIPTION

The jet engine protection systems described herein are directed to preventing serious damage to modern jet engines due to ingestion of relatively large birds or other objects. Two principal mechanical systems or sub-systems include a set of rods or tubes configured into a cone-shaped arrangement upon deployment and, secondly, a deployable airbag-like device. These preferred embodiments function to reduce the severity of an engine-bird impact by breaking up the bird or deflecting it altogether. Both of these systems or sub-systems preferably comprise a sensor sub-system, a threat level evaluation sub-system and an actuator sub-system. In general the sensor component or sub-system detects an oncoming object in the aircraft's flight path and then sends data signals to the evaluator, which typically is a digital computer or digital processor, most preferably a real-time embedded software program. The evaluator determines the likelihood of the object's collision with the aircraft and then generates output control signals to actuate the mechanical deterrent sub-system or device. These systems can involve and employ, in addition to well-developed materials technologies, modern conventional technologies such as bird detection radar, miniaturized computers utilizing fast computational algorithms, components such as actuating mechanisms and materials from automobile crash airbag systems, advanced reactive defensive system components, and, optionally, microwave technology or other directed energy methods.

The systems described herein are intended to protect a modern jet engine against relatively large birds or other objects which, if ingested would seriously damage or destroy the engine. The active components or members of these systems are dormant during routine aircraft operations, and preferably are automatically actuated only when an immediate need, i.e., imminent collision arises. After use in flight, the active members are then returned to their dormant, non-interfering position or disposed. In general, the overall system preferably includes a sensor sub-system which detects birds entering the intended flight path of the aircraft; computer implemented fast computational algorithms that track and identify such birds or objects from the detected set that are projected to enter a zone which would lead to ingestion by the engine and are of a size large enough or weight great enough that they would seriously damage the engine if ingested, and a momentary defensive system, such as a mechanical guard device, a maneuver routine, or a directed energy emitter. Shortly before the detected obstacle is to arrive at the point of impact, the momentary defensive system is turned on and acts instantaneously to shield, deflect, reduce the size or destroy the approaching bird so that it or its remains are reduced to mass that will not cause serious damage to the engine. After the ingestion threat has passed, the active devices are preferably stowed, retracted, safely jettisoned, or deactivated.

In order to establish a broad range of useful applications the present systems are intended for and adapted for functioning in scenarios beyond existing FAA regulations. In particular, FAA regulations FAR 25.631 and 25.571(e) (1) mandate commercial aircraft empennage leading edge resilience to bird strikes in an 8 pound weight class and below. Heavier birds, such as geese pose a significant threat to both the airframe and the engines. As seen in US Airways flight 1549's Hudson River landing, flocks of such birds pose an even greater threat, a threat that is outside of currently mandated resilience.

Due to the severity of commercial airline-class accidents the present systems are most preferably adapted for use in such aircraft. One can consider a representative 747-class aircraft encountering one or more Canadian geese, which typically weigh more than 8 pounds, as a scenario to which the present systems are addressed. Such an encounter could occur at almost any altitude. While high-altitude bird strikes are less common, they have been confirmed at altitudes in excess of 30,000 feet. Based on historical data, about 41% of reported civil aircraft bird strikes in the United States occur during take-off or landing. In addition, about 75% of all bird strikes occur at less than 500 feet above ground level (AGL). During the 1990-2008 period more than 2,200 bird strikes involving civil aircraft at heights above 5,000 feet AGL were reported in the United States. It is believed that a commercially-viable system should offer protection in all of these scenarios, and the nominal case of an encounter at cruise speed is considered for the reason that this poses the most stringent requirements on the system.

Deployment Requirements

To understand the loads resulting from the impact of a bird, the duration of the collision event, sometimes referred to as the "squash-up time", must be determined. Experimental results show that this event commonly lasts 3-6 milliseconds.

Based on the representative aircraft and bird type, the timing requirements for deployment of the system can be determined. Suppose a 747-class aircraft is cruising at 555 miles per hour (48,840 feet per minute) and encounters a Canadian goose in its flight path. If the bird is flying at 3,500 feet per minute and the sensor sub-system can detect its presence at a range of 0.5 miles, then the time between detection and collision would be approximately 3 seconds. If a safety factor is included in the calculation, the deployment time for the mitigation device would be no more than 1-2 seconds. To meet this deployment requirement, damped pyro actuators would be suitable, as would be a linear actuator.

Sensor Sub-Systems

Conventional RADAR and LIDAR systems have the capability for performing the sensor functions in the present systems and are therefore considered to be preferred components in a sensor sub-system. As used in this context the term LIDAR is intended to have its commonly understood meaning: a device that is similar in operation to radar but emits pulsed laser light instead of microwaves. A LIDAR system similar to the Riegl VQ-480 system has a beam footprint of approximately 9 inches in diameter at a distance of one-half mile (considered to be 2,600 feet). To register an object on this system, the target must be larger than the footprint of the beam or consecutive scans must be made to overlap and thus to create an effectively smaller footprint. For a bird with a frontal silhouette of 12 inches in diameter, a conservative estimate for a Canadian goose, the LIDAR beam will easily register the target at this distance without needing to overlap scans. If the beam is swept across its 60 degree field of view, that is 90 feet above and below the aircraft, which is 2 degrees above and below the projected flight path, at a scan rate of 100 scans per second, it will take nearly 2.5 seconds to sweep across the entire area of interest. Because this scan time is on the same order as the time available for the nominal case deployment time, it is believed that a LIDAR based sub-system will function successfully as a sensor component or sub-system. LIDAR products with longer detection ranges are already commercially available, and this technology is likely to advance in the coming years, further enhancing the sensitivity of the system.

Referring to FIG. 1 a first preferred embodiment is shown that schematically depicts various component parts of a jet engine protection system and their relationships each to the other. The overall system preferably includes a RADAR or LIDAR sub-system, which further includes a conventional antenna (not shown) and associated, conventional mechanisms and circuits used to convey data signals to a digital computer or processor sub-system (not shown). Commercially available radars such as those available from Accipiter Radar Technologies, Inc., a subsidiary of Sicom Systems Ltd., known as the Avian Radar Detection System (AccipiterAR), or the DeTect Inc. Merlin Radar Detection System may be used in the present systems. Commercially available LIDAR systems such as the Riegel BP560 or VQ480 product families may be used in the present systems.

Threat Evaluation Sub-Systems, Entire System Control and Algorithms

The processors for use in the present systems are digital computers and corresponding computer-implemented software algorithms adapted to control the operation of the entire system and to function as the threat level evaluation sub-system. It is believed that conventional computers and algorithms such as those used in the AccipiterAR System, the DeTect Inc. Merlin, or the Traffic Collision Avoidance System (TCAS) (original and improved versions) can be employed, with relatively minor adaptations to provide the processing functionality and features of the presently described systems. Specifically, the TCAS system for intra-formation control as described in European Patent Specification EP 1,147,506 B1, hereby incorporated by reference, exemplifies such a conventional system. Specifically regarding the computer implemented software or code for implementation of the presently described systems, the basic code or algorithm is commercially available and operating in the TCAS system. In its second generation, TCAS II, such software is commercially available from Rockwell Collins, as its ACSS (Aviation Communication & Surveillance Systems) product and from Honeywell Aerospace as its "CAS 100" product. It is believed that the TCAS system presently being developed referred to as "TCAS III", can also readily be adapted for use in the presently described systems. Also, the computational algorithms as used on the AccipiterAR System, or the Merlin Radar Detection System, combined with that used in the TCAS as developed in conjunction with the MITRE Corporation may be used. It is envisioned that adaptation of the computational algorithms to determine whether the size of the bird is sufficiently large that actuation of the defensive mechanism(s) is required, and to control automatic actuation of the active members of the defensive mechanism(s) is within the ordinary skill of this art.

Mechanical Deflection Sub-Systems

The first preferred mechanical embodiment or sub-system includes a set of streamlined rods or tubes spaced evenly around the circumference of the nacelle lip at its forward or leading end. They are preferably housed in the engine nacelle cowling, center hub, or aircraft fuselage structure, and can be actuated to instantly deploy directly in front of the engine. When deactivated, this embodiment can be stowed by returning to its original configuration positioned inside the engine nacelle cowling, center hub, or aircraft fuselage structure. These rods are intended to function to deflect the incoming avian threat away from the engine or to fragment the carcass to a size that does not threaten he engine. The rods or tubes are preferably streamlined and evenly distributed around the circumference of the nacelle. When deployed they meet at or near a single point in front of the engine. The rods are stowed in a retracted position in the front of the engine nacelle, and are actuated forward when a bird impact is imminent. Once the bird threat has subsided, the rods are retracted back into the nacelle to permit unobstructed airflow to enter the engine.

The rods are preferably deployed in either of two ways: first, by a mechanical actuation device driven by a motor; or second, by a pyrotechnically actuated device. It is envisioned that the pyrotechnical device will require less mass and will be easier to integrate into the aircraft nacelles. In order to deploy straight forward toward the front of the engine, a damped pyrotechnic actuator would ignite in order to push the rods through a set of guide holes. The guide holes would function to ensure alignment. The system would also be constructed so that the guide holes would force the leading ends of the rods to meet or come close to meeting at a common vertex. The deployment time would be on the order of one second.

Figure 6:
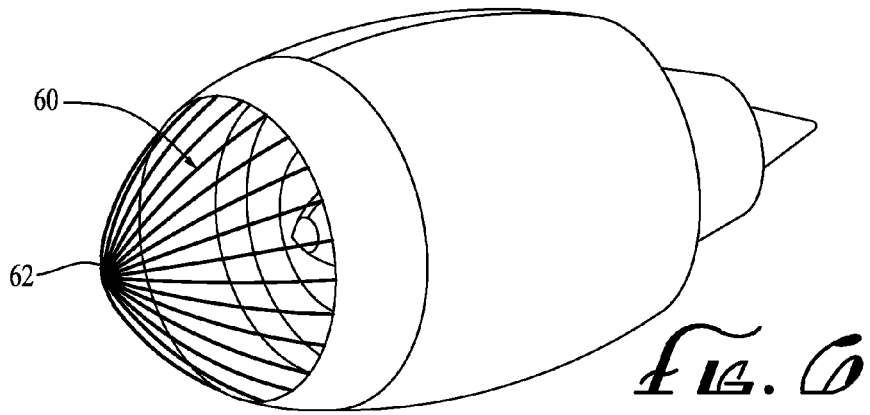
FIG. 6 is a simplified perspective view of the FIG. 4 embodiment shown in the extended position as shown in FIG. 5.
Figures 6A, 6B:
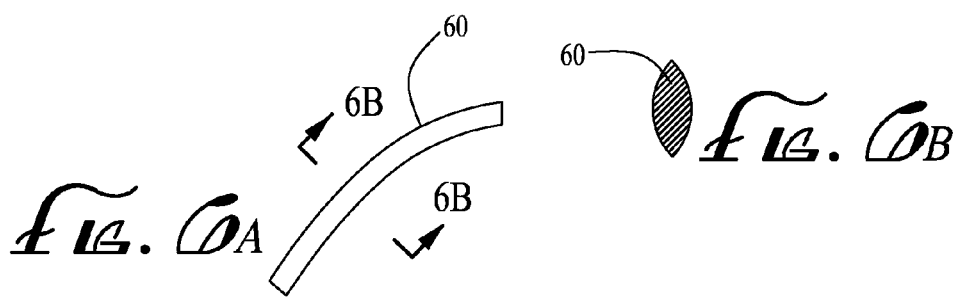
FIG. 6A is a side view of an alternate, biconvex shaped rod used in the defensive system.
FIG. 6B is a cross-sectional view of the FIG. 6A rod, taken through line 6B-6B of FIG. 6A.

Detailed analysis of bird impacts can be found in the academic literature. In many studies, the bird has been modeled as a soft body and treated as either a uniform fluid, such as water, or as a mass with variable density, such as water with air bubbles. To estimate the forces which the cone of rods or tubes might experience during a bird impact, one can consider a bird colliding with a single tube, and at the tube's midpoint so as to present the worst case scenario. When the bird collides with the rod, the rod experiences a near-instantaneous shock pressure followed by a stagnation pressure. Both events together last a total of only a few milliseconds. For the nominal case of an 8-10 pound bird on a collision course with a 747, the collision event can be expected to last six milliseconds. Based on experimental data, the shock pressure for this case would be on the order of 275 MN/square meter and the stagnation pressure 30MN/square meter. Assuming that the bird-tube impact area is 4 square inches (about 26 square centimeters), this translates to a force of 0.715 MN during the shock event (which lasts on the order of 1 millisecond) and 0.078 MN for the stagnation period following the shock. A titanium tube was considered to undergo the impact event at its midpoint. The deflection at the midpoint was predicted to be 0.6 inch. This model did not take into account the possibility of the bird splitting in half. The tube had a nominal 4-inch diameter and a wall thickness of 1-inch, which is conservative. The model assumed that the bird impacted the tube and came to a complete stop. Further, this model was based on a tube of circular cross-section. With reference to FIGS. 6A and B, a biconvex or airfoil-shaped cross-sectioned tube or rod would sustain less force upon bird impact and would exhibit greater strength in the impact direction.

In one preferred embodiment the cone of rods or tubes is augmented with additional structural members near the nacelle lip. These members mitigate the possibility of an ingestion in this region, where the rod spacing may exceed the dimensions of the bird's body, thus leaving a hole big enough for the bird to slip through. These additional members would initially deploy with the parent rods and then be folded outward using a spring. One such configuration envisions shaping for the rods such that each rod would have a diamond-like shape in cross-section, and with two sharp corners and two rounded corners. The rod, as thus configured, therefore would have two sharp edges, like a sword, to ensure that the bird will be split into two pieces, or more depending on where the impact occurs.

When stowed the members or rods reside in the front portion of the engine nacelle. In one preferred embodiment, upon receipt of a control signal for actuation, gases generated by small explosive charges propel the ring forward to push the rods out of the nacelle. The ring is guided by linear bearings and moves on a path parallel to the engine shaft, that is, its longitudinal axis. A fixed ring is also mounted inside the nacelle close to the inlet lip and functions to guide the rods or tubes during the deployment step. Holes in the ring serve to orient the rods forward and towards the hub. The rods, tubes or other shaped members meet at or near a point, forming a cone. At the base of the cone additional rod-like members form a lattice which protects the outer annulus of the engine intake area. The members of this lattice attach to the primary rods and to the nacelle lip. When the device is to be retracted, the nacelle lip attach points release the secondary rods. The ring to which the primary rods are attached is winched back into its original location in the nacelle via a cabled pulley system with the rods being guided by the guide holes in the front of the nacelle also return to their stowed position. The terms used to describe this alternate embodiment have their ordinary meaning as would be commonly understood in this field and it is believed that construction of this embodiment is within the ordinary skill of this art.

In another preferred embodiment an inflatable bag is provided and adapted to be deployed in front of the engine. The bag would be deployed and inflate rapidly in much the same manner as automobile airbags. Also, as with the cone of rods embodiment, the airbag embodiment would be actuated by the threat level evaluator sub-system. Because of an airbag's comparatively greater impact on airflow into the engine, it is desirable to minimize the duration of the deployment, that is, to actuate retraction as soon as possible once the bird has been deflected. Two embodiments or approaches are preferred for deployment, and they are contingent on the precision with which the bird's location can be determined. It is believed that a bird's location, once tracked by the sensor sub-system, may be known only to within a radius of a few meters. To reduce this uncertainty a dual sensor sub-system would be used. In such a usage a primary, nose mounted sensor would sweep the airspace in front of the plane and would be used to determine onto which side of the fuselage the bird it likely to impinge. Following this determination, a second, or last-second triggering sensor located on the presumed impact side would confirm the bird's approach to that side and subsequently deploy the airbag at the appropriate engine.

Alternatively, if the trajectory of the incoming threat, presumed to be a bird, relative to the aircraft can be predicted by the evaluator sub-system with relative high certainty, the airbag's deployment could in theory be targeted to collide with the bird en route to the airbag's return to a stowed configuration. In this context the term "airbag" is used broadly to refer to a flexible and/or inflatable member that could perform the described function. Intercepting the bird at the correct instant would greatly reduce the amount of time that the deployed device or member blocks the airflow into the engine.

Two shapes are envisioned for the airbag structures. One would have a minaret shape that could potentially deflect the bird and put it on a path around the nacelle, rather than through the engine. Another shape is similar to that of the well-know Hershey's kiss candy drops, with flat end pointing forward from the engine and the pointed end attached to the hub These mechanical sub-systems are intended to operate on the modern high-bypass ratio turbofan jet engine; however, they could be used on the turbojet engine as well. Additionally, the systems are not limited to use solely on a jet engine; there are other aircraft types in which they can be utilized for protection against impact from birds. Specifically, they can be employed to protect the exposed, vulnerable components of a helicopter rotor system against threats posed by relatively large birds and other objects.

The presently described systems are intended to address major problems that have not been addressed by known aircraft engine protection systems. In those systems, typically some type of screen device is permanently affixed in front of the engine. This causes at least two major problems for any jet aircraft engine: having to deal with unwanted effects created by the very nature of the devices, such as for example ice formation, and disruption of airflow into the engine which in turn causes significant and unacceptable reduction in engine performance. The solution presented here includes active members that are brought into operation at the point of need to deal with a bird or object about to collide with the engine, and are subsequently withdrawn or stowed or retracted after the need has passed. It is believed that embodiments employing these principles eliminates both of the above-described problems and leave routine engine operation undiminished by its presence. Yet the presently described system embodiments are ready to perform at any time, without requiring action by the pilot or other person(s).

The preferred systems include an active defensive mechanical system, sub-system or unit, including an actuator sub-assembly and a defensive device that is adapted to engage incoming birds or other objects, and which may be in the form of several different, preferred embodiments. These systems are believed to be a prime solution for use on numerous jet-engine-powered aircraft, both turbojet and turbofan, as well as on helicopters and VTOL/VSTOL/STOVL aircraft.

With reference now to the drawings, preferred embodiments of jet engine protection systems, sub-systems and components will be described. As shown in FIG. 1 aircraft 20 includes a first jet engine 22, second jet engine 24 and a sensor sub-system 26 mounted in the nose of the aircraft. The sensor sub-system 26 detects airborne obstacles in front of the aircraft and sends data signals representative of the speed, size, range and direction of travel of the obstacles to an embedded processor 28 which preferably runs real-time evaluative algorithms to process the sensor data. A defensive mechanism 30 is positioned on the first engine 22 and a second defense mechanism 32 is positioned on second engine 24. These defensive mechanisms may optionally be activated or retracted by mechanical or explosive actuators 34, 36, respectively in response to control signal sent by processor 28 to each of the actuators 34, 36.

Also referring to FIG. 1, the processor 28 communicates with the aircraft's autopilot system 38 and cockpit display system 40 in order to broaden the system's response to a detected airborne object, such as a bird. Based on the computed threat level of the obstacle, the embedded processor 28 will transmit control signals to actuate mechanisms 34 and 36, to alert the pilot via display 40, and/or send a command signal to autopilot 38 to automatically maneuver the aircraft.

FIG. 1 represents these primary system elements in a schematic manner for one of the engines. The preferred system would be installed on all engines of the aircraft.

Figure 2:
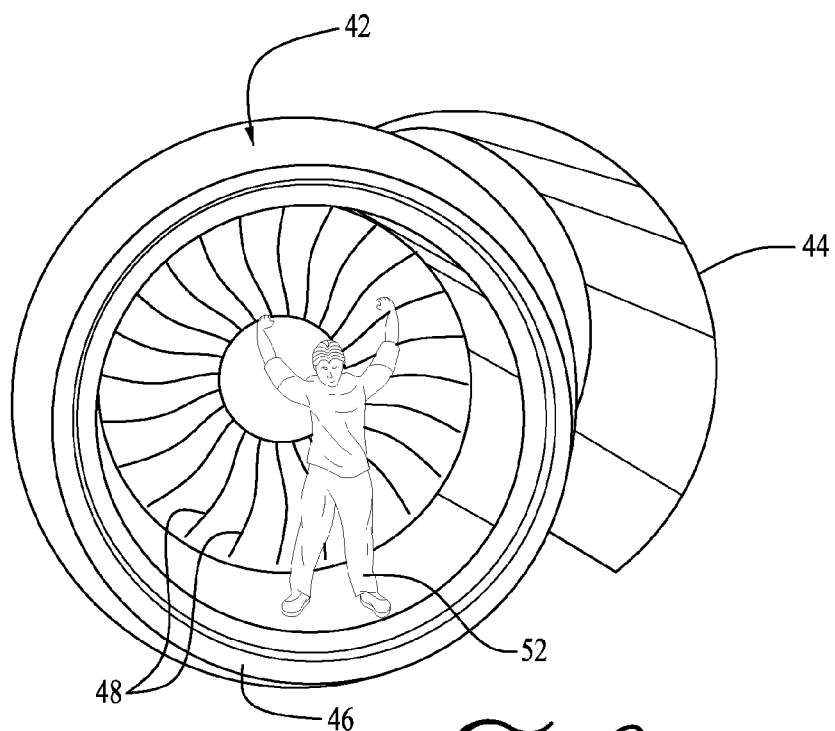
FIG. 2 is a front view of a modern, conventional high-bypass ratio turbofan jet engine.

Referring to FIG. 2 a front view of a conventional, typical high-bypass ratio turbofan jet engine illustrates the nacelle cowling 42, nacelle housing panel 44, nacelle lip 46 and engine blades 48. This type of engine has a relatively large size of the inlet to be protected against bird strikes or ingestion of other airborne objects as illustrated by showing the man 52 standing inside of its air intake structure.

Figure 3:
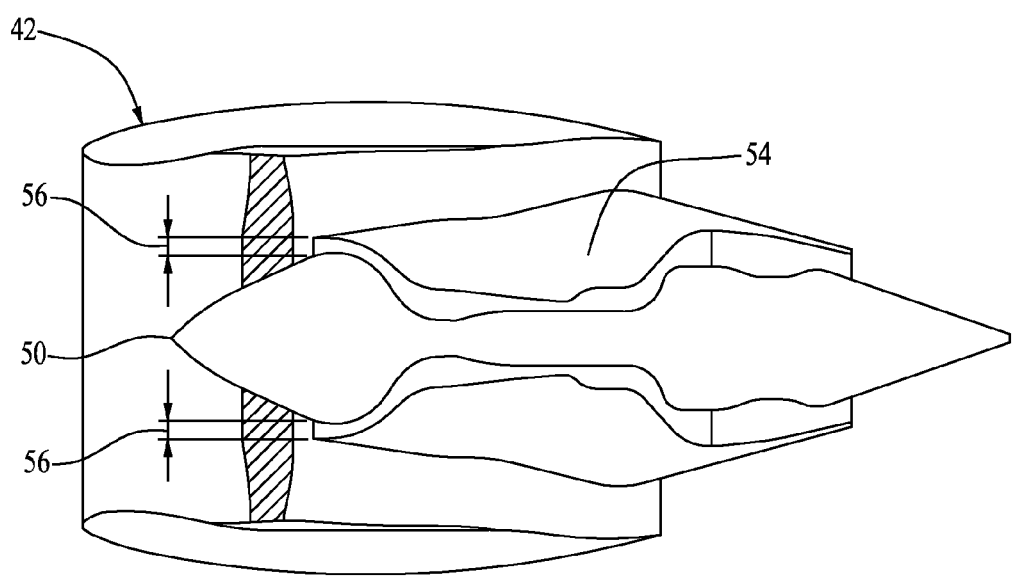
FIG. 3 is a simplified cross-sectional view of a modern, conventional high-bypass ratio turbofan jet engine.

FIG. 3 shows a modern high-bypass ratio turbofan jet engine in cross-section and with several components positioned in relation to the jet engine's center hub 50, the nacelle cowling 42 and the engine core 54. The active components of the deflection device can be fixed or secured, adhered, positioned and/or attached to the inside of the existing structure of the nacelle cowling 42 or the center hub 50. These embodiments as well as other embodiments may provide for different locations for the active components and the other components indicated. Intake area 56 of the core of the engine is a region of increased sensitivity to foreign object incursion, and thus requires increased protection relative to other areas of the engine.

Referring to FIG. 4 a preferred embodiment defensive sub-system is shown in which the active components 58 are housed in and circumferentially around the engine nacelle cowling 42. These active components include screens or guards made of rods or tubes of metal or other material and can be provided in numerous forms and locations. They can be separate apparatus and/or secured or fixed, adhered and/or attached to the nacelle cowling and/or to the center hub 50 by various conventional methods. FIG. 4 shows the active components or members in their retracted or stowed positions. FIG. 5 shows the active components in their extended positions, forming a cone 60 that extends out in front of the engine. The active members and the nacelle cowling are structured and adapted so that each of the active members form an arc such that together they form a cone with the distal ends of the active members preferably touching or nearly touching to form the tip of the cone at 62. FIG. 6 illustrates the cone-shaped configuration of the active members in the extended position. Variation in length and curvature, as well as cross-sectional shape may apply to the embodiments shown in FIGS. 4-6.

The active components of the defensive system are preferably blades, rods, tubes or metal members. A multiplicity of these extensible-retractable metal shield shafts, rods, tubes or blades 58 are located around the periphery of the nacelle cowling 42 and shaped such that, on extending, preferably they will form a curved, slatted surface in front of the engine face and will function to deflect or otherwise destroy the oncoming bird(s) to such an extent that serious damage to the jet engine is prevented.

As shown in FIGS. 5-6 the shafts/rods/tubes/blades 58 are in their active or extended position 60, such that all preferably touch each other, or come close to touching each other at their apex on the longitudinal centerline of the engine and thus function to prevent bird(s) or foreign object(s) from entering the engine. With reference to FIGS. 6A and 6B an alternate configuration for the rods or tubes is shown. In this alternate embodiment the rods or tubes have a biconvex shape, a side view of which is shown in FIG. 6A and a cross-sectional view of which is shown in FIG. 6B. The shafts/rods/blades can also take a lacing configuration and/or a longitudinal configuration as well as having a curved shape, for example, with the term "lacing" having its commonly understood meaning in this field.

Figures 7A, 7B:
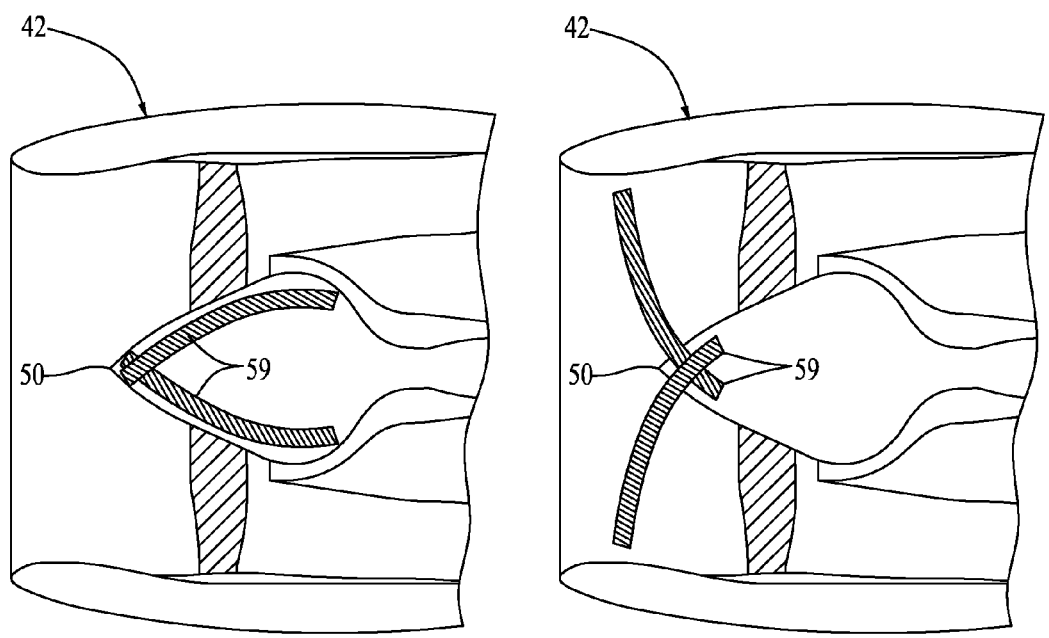
FIG. 7A is a cross-sectional view of an alternate embodiment in which the active members are stored in the center hub of a modern, conventional jet engine and shown in their stowed position.
FIG. 7B is a cross-sectional view of the FIG. 7A embodiment but with the active members in their extended or deployed position.

With reference to FIG. 7A, an alternate preferred embodiment is shown, and in which the active elements 59 are housed in the jet engine's center hub 50. FIG. 7A shows the positioning of these active components 59 in their stowed or retracted positions within the center hub 50, with fan blade attachment (shown with diagonal lines, but not numbered) and nacelle cowling 42 for a typical modern high-bypass ratio turbofan jet engine. It is within the empty interior space of the center hub 50 that the active elements of this embodiment are housed. FIG. 7B illustrates these active elements or members in their active or extended positions. These extensible/retractable members may be made of metal and in the shape of shafts, rods, tube or blades, preferably having the same or similar shapes, but not necessarily the same size or angular orientation as shown in FIGS. 4-6. They may be fixed, secured, adhered, positioned and/or otherwise attached within the center hub.

Figure 8:
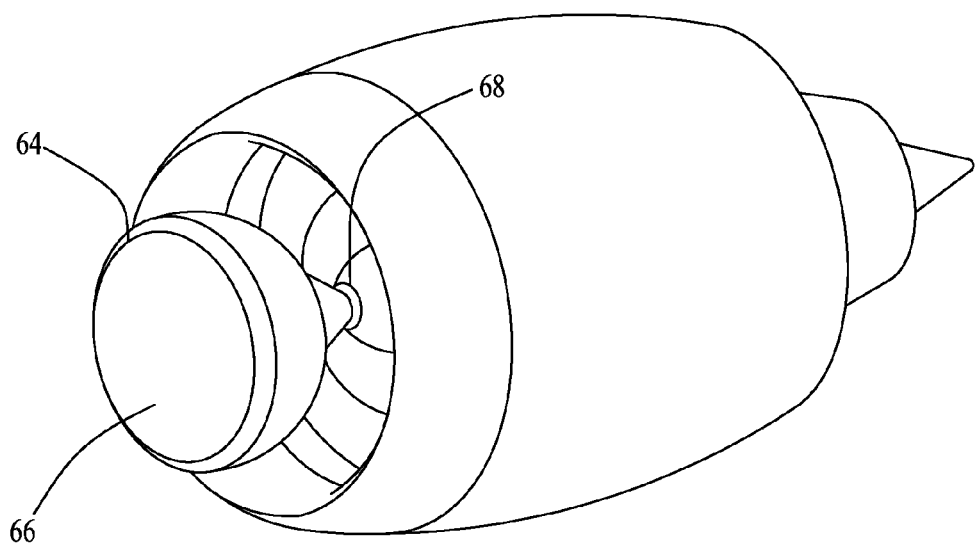
FIG. 8 is an isometric view of an alternate embodiment comprising a high-strength, inflatable fabric bag in an actuated position.
Figure 9:
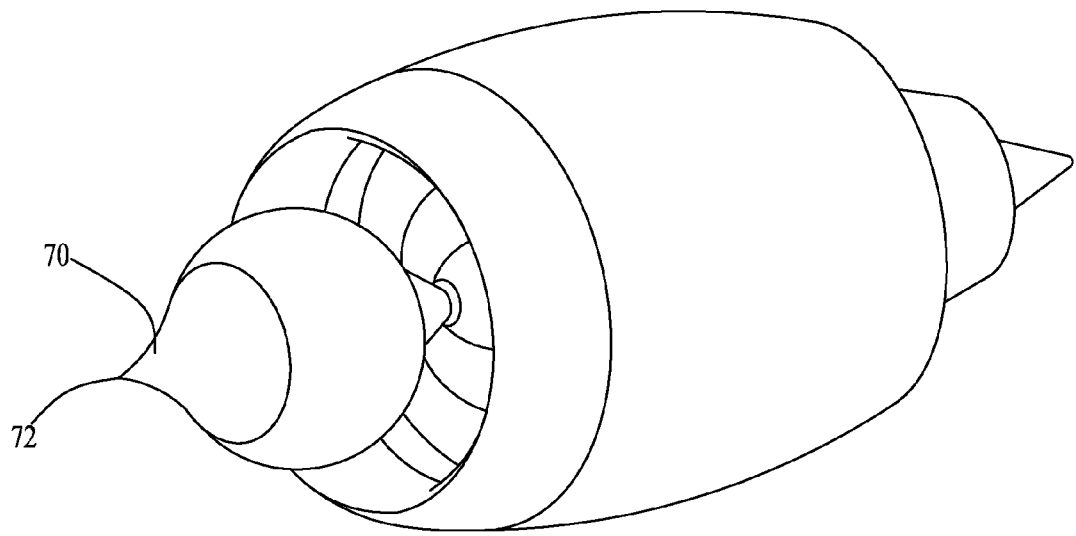
FIG. 9 is an isometric view of an alternate embodiment inflatable fabric bag having an alternate shape compared to the FIG. 8 embodiment, and with the bag depicted in an actuated position.

Referring to FIGS. 8-9 the airbag preferred embodiment of the present jet engine protection system is shown. In the FIG. 8 embodiment the defensive system's active element is preferably a high-strength inflatable bag 64 having a relatively flat or blunt leading end 66 that tapers to a relatively narrow cross-section 68 where it joins the engine hub 50. The FIG. 9 embodiment bag 70 is shaped like a minaret, with its leading edge coming to a point 72. The bags are preferably made of a fabric that will function to deflect an incoming bird or other object but will not seriously damage the jet engine if ingested into the engine, such as for example, an aramid fabric or material, commonly referred to as "Kevlar". In the stowed position the bags 64, 70 are fixed, secured, adhered, positioned and/or attached within the center hub 50 of the engine. As shown in FIGS. 8-9, the inflatable bags are shown in their actuated position or inflated condition. Once the impact has taken place, the bag is stowed, retracted or safely jettisoned. Also, various methods of securing, fixing, adhering and/or attaching to the center hub may apply to the FIGS. 8-9 embodiments. Variation in size and shape of the actuated airbag may also apply to the FIGS. 8-9 embodiments.

Figure 10:
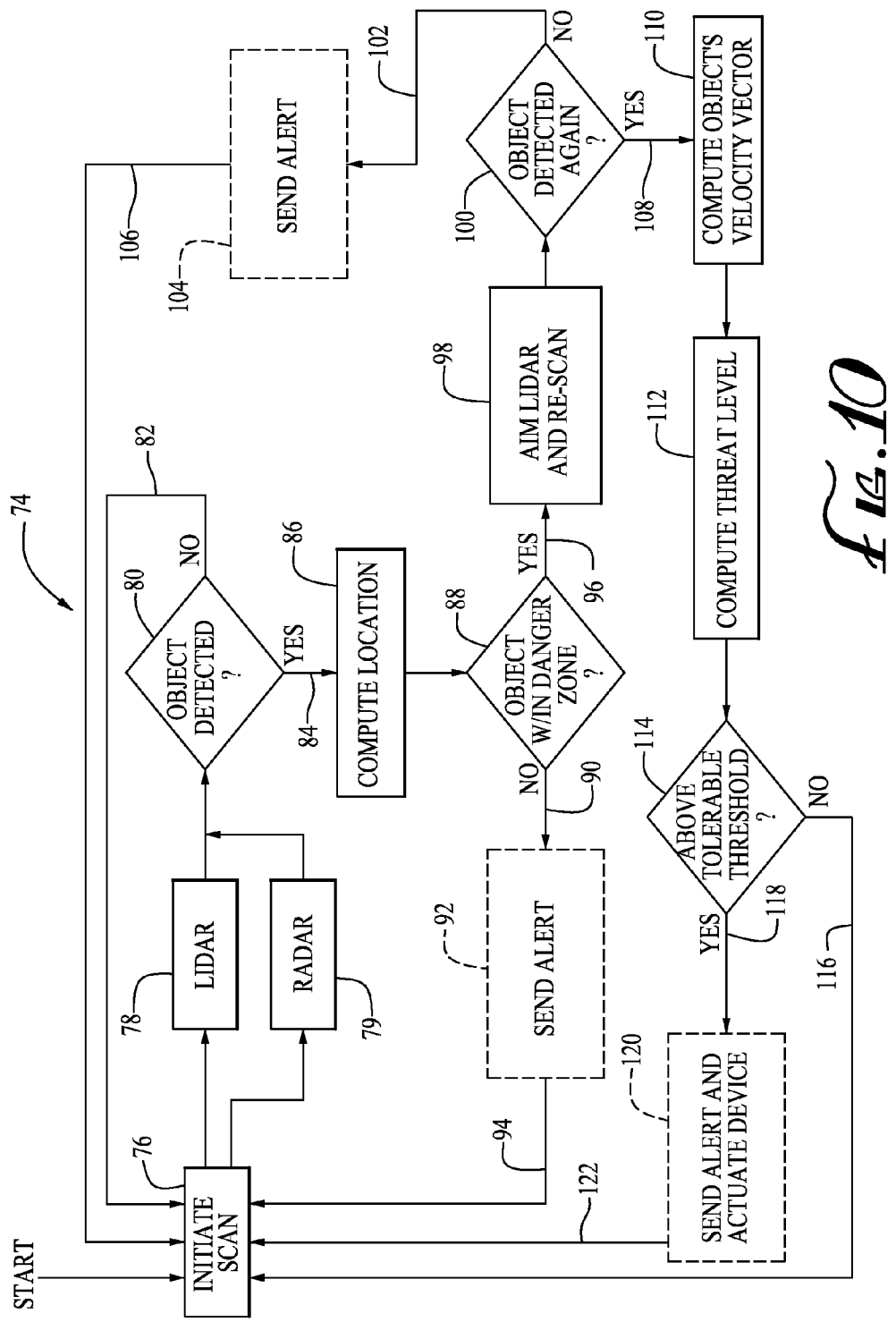
FIG. 10 is a simplified schematic of an embodiment of the real-time computer program algorithm that can be used to assess the threat level of the detected airborne object, such as a bird.

Referring to FIG. 10, a schematic or block diagram of a preferred embodiment of the sensor data processing software algorithm 74 and its functional steps are shown. This software preferably functions to control the protection mechanisms, without requiring intervention by a human operator. Based on detection and evaluation of the bird threat, the processing software emits a notification message to the cockpit and an "alert" signal to cause the mechanical sub-system to be actuated or, in other conditions to not be actuated if the threat does not imply a collision.

Searching the possible-hazard airspace in front of the aircraft is done automatically by initiating sensor scan 76, by both the LIDAR and the RADAR sub-systems 78 and 79, respectively. When the LIDAR sub-system 78 signal indicates a return from the defined scan sector in which a potential threat could occur, there is the possibility that it is an actual object, shown at decision point 80.

If the software algorithm determines that there was no object, the system returns to scanning as before and as shown by line 82. If an object is detected, then information from the RADAR subsystem 79, which has been operating simultaneously, is, as shown by line 84 sent to another functional part of the algorithm and is used to compute the location of the target in space, illustrated at 86. This dual-sensor approach exploits the precision azimuthal ability of the LIDAR 78 and combines it with the high-resolution range information from the RADAR 79 to provide a highly precise location of the target at 86.

The software then checks, at 88 to determine if the detected object is within a pre-determined danger zone. The danger zone location information would be predetermined by conducting analyses that investigate a wide range of parameters involved in the multiplicity of situations that could be anticipated, so that essentially all possible aircraft/bird encounters would have been evaluated. Example variables included would be: bird type, size and weight; bird flight speed and ability to change direction in-flight; aircraft type, such as make and model; essential capture area of the specific engine(s) on the aircraft; aircraft position and attitude including current speed, altitude, rate of climb or descent, heading and heading change, maneuver limitations, especially limiting "g" forces, and any other information having a bearing on a potential collision. If this check indicates that the object is not presently evaluated to be within the danger zone, and therefore does not pose an immediate threat to the engine(s), a signal is sent via line 90 to actuate an alert. The alert is sent to the pilot(s) because it is considered important to inform the pilot(s) of the possibility of a danger, and to make the pilot(s) aware of the potentially dangerous situation. Pilot workload is high, especially so during the flight segments when the preponderance of bird collisions occur, namely takeoff and landing. It is important to convey such information to the pilot in a timely fashion, but it is also important that unnecessary information be strictly avoided. It is envisioned that the precise way in which this information will be conveyed will be the result of a collaborative effort with government agencies and airline community participants. In the event the algorithm makes the determination at 88 that the object is not in the danger zone, an alert, shown at 92 would be communicated to the pilot(s). The alert preferably would include a caution indicator light on the cockpit panel and/or an aural warning to the pilot(s), with a statement, for example: "Possible hazard detected at XX azimuth, YY elevation. Check visually", with the system automatically stating the actual azimuth and actual elevation of the object. At this point in the evaluation of available information, there is always the possibility of a false alarm, so the specific location and color of the caution indicator within the cockpit and the wording of the aural warning would be carefully determined. Once the alert is sent to the pilot(s), or simultaneously with sending the alert, the algorithm signals, via line 94, the system to return to scanning at 76.

Returning to the calculation shown at 88, if the object detected is determined to be within the pre-determined danger zone, the algorithm directs, as shown by line 96, the LIDAR sensor to aim and search in the vicinity of the detected object, where it re-scans the region of interest, as shown at 98. If time permits, the sensor will scan twice or more, and the computer implemented software will compute an estimate of the bird's trajectory. Output from the LIDAR will indicate either a repeated detection or no further detection, as shown at 100. If in this period an object is no longer detected, this information is conveyed, as shown by line 102 to the pilot(s). In this situation, the pilot(s) should be informed as in the earlier instance, as described above in connection with the alert represented at 92. At this point, the system has collected and processed additional information about the object, such as whether an increased likelihood of an actual possible collision exists. The pilot(s) need(s) to be alerted of any such higher level of concern, so the specific information communicated to the pilot(s) would indicate any increased need for caution. As discussed above, collaboration with government agencies and the airline community would determine the exact way to convey the information. Preferably, an aural warning different than the one described above would be indicated, as shown at 104. For example the audible statement triggered at 104 could be: "Momentary LIDAR reading of possible hazard, no longer in field of view". Similarly, a different indicator light preferably would be selected. Following or simultaneous with actuating the warning, the system would signal, as shown by line 106 that scanning re-initiate or continue scanning as shown at 76.

Returning to the object detection function represented at 100, in the case where the object has been detected again, system will signal, at 108, the algorithm to use data from the LIDAR 78 and RADAR 79 sensors to compute the object's velocity vector as represented at 110. This information is needed to calculate the precise trajectory or geometry for a bird-to-aircraft collision. With the computation made at 110, the system will then compute a threat level by comparing the current situation with stored data, as shown at 112. These data will have been developed by analyzing possible encounter situations and then designating, or pre-determining a set of categories of collision likelihood, for which parametric levels of threat would be assigned. Not all encounters will lead to a collision and thus the algorithm would make a decision on whether the calculated threat is above a pre-determined threshold, as represented at 114. If the threat level determined is not above a tolerable threshold, the system will signal, via line 116, return to scanning at 76. If the threat level is determined to exceed the pre-determined, tolerable threshold level at 114, the system then preferably will send a signal, shown at 118, to generate an alert to the pilot(s) and automatically commence actuation of the engine protection device, as represented at 120. Also, if time does not permit—for example, if the bird is within a pre-defined zone too close to the aircraft to expend more time on data processing—then an alert and/or actuation signal will be sent and the engine protection device actuated automatically. As discussed above, collaboration among government agencies and the airline community will determine the exact visual and verbal means by which to convey the information. Because multiple birds may be in the area, a signal, via line 122, will cause the system to continue to operate by continuing its scanning as shown at 76.

Referring to FIGS. 11A and 11B, an alternative embodiment of the inflatable bag member is depicted as inflating bag 124 in FIG. 11A. The bag 124 is mounted at two or more points 126 along the lip 128 of the engine nacelle 42. When a bird 130 approaches the engine, the folded, stowed bag 124 begins to be deployed from one side of the nacelle 42, the left side as shown in FIG. 11A. During deployment, pressurized air is forced into the bag via tubes 132 at the attachment point and the bag begins to take on a more inflated form shown at 134 and begins to rotate in the direction of arrow 136. Referring to FIG. 12A, the bag is shown in its fully inflated position 138 intercepting the bird and "catching" it in a pocket of fabric at 140. The bag continues to move in an arc-like path in the direction of arrow 142 and removes the bird from its collision path. The bird and bag may then be jettisoned, shown in FIG. 12B at 144 and downstream in the direction of arrows 146, 148 and 150 and away from the engine at 152. Alternatively, with reference now to FIGS. 13A and 13B if the bag 138 is secured in place and held firmly at the attachment points 126, the bird may be held against the side of the nacelle 42 for the remainder of the flight as shown by arrows 154 and 156.

Referring to FIG. 14, a frontal view of the inflatable moving bags of FIGS. 11-13 is shown with the engine inlet in the background. The device has inflatable pockets, one of which is illustrated at 158. In FIG. 15, an isometric view of this device is shown.

Figure 17:
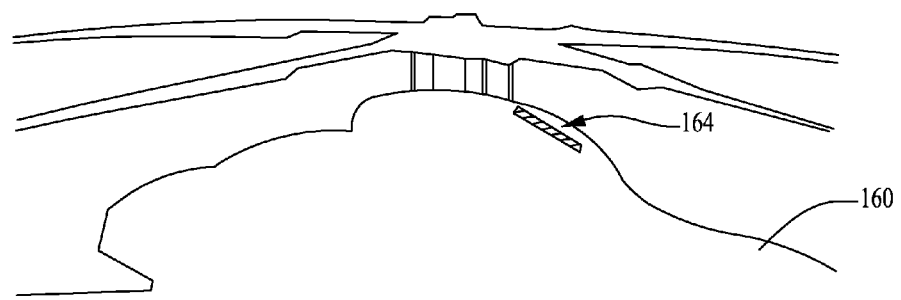
FIG. 17 is a second schematic representation of a helicopter, depicting an alternative embodiment aircraft protection system at the helicopter blade control mechanism location and with its protective metal structure in a stowed or retracted position.
Figure 18:
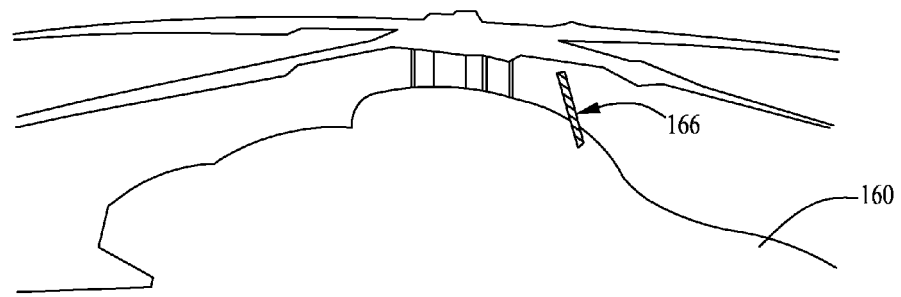
FIG. 18 is a schematic representation of the FIG. 16 embodiment depicting the protective metal structure in an active or extended position on the helicopter.

Referring to FIGS. 16-18 an alternate embodiment adapted to provide a defensive system adapted for use with a helicopter 160 is shown. FIG. 16 shows at location 162 the area in front of the helicopter blade control mechanism. A preferred location for the defensive device or member at location 164 is shown in FIG. 17, with the active elements of the device shown in their stowed or retracted positions in FIG. 17 and in their active or extended position 166 in FIG. 18. This alternative embodiment preferably employs the same type of system components as previously described with respect to the embodiment shown in FIG. 5, modified or adapted so that the metal shafts/rods/tubes/blades are positioned along the longitudinal centerline of the helicopter. When in their extended position they function to prevent bird(s) or foreign object(s) from striking the rotor control mechanism. The shafts/rods/tubes/blades can also take a lacing configuration, as that term is commonly understood in this field, and/or a longitudinal configuration as well as having a curved shape, for example.

Other alternative embodiments not illustrated include having the active components or active member(s) made of resistive armor and shaped to function as defensive armor, or including a directed energy device, such as a microwave transmitter that has the capability of transmitting a beam of sufficient intensity to destroy, deflect or injure the bird to prevent it from continuing on its collision course with the jet engine. Other alternate embodiments not illustrated and specifically adapted for use on aircraft having jet engines mounted to the aircraft's fuselage include having the active components positioned or attached to the fuselage upstream or forward of the engine air intake, and upon activation then extend outward in front of the engine to destroy the bird using blades or other solid members, or deflecting the bird using a bag or bag-like structure.

Because many varying and different embodiments may be made within the scope of the inventive concepts herein taught, it is to be understood that the descriptions herein are to be interpreted as illustrative and not in a limiting sense. Although specific embodiments of the invention have been described, various modifications, alterations, alternative constructions, and equivalents are also encompassed within the scope of the invention. The specification and drawings are, accordingly, to be regarded in an illustrative rather than a restrictive sense. It will, however be evident that additions, subtractions, deletions, and other modifications and changes may be made thereunto without departing from the broader spirit and scope of the invention as set forth in the claims.

What is claimed is:

1. A jet engine protection system for an aircraft comprising:
   a. a sensor sub-system positioned on said aircraft, adapted to scan an area of interest in front of said aircraft, adapted to detect a flying bird having a size greater than a predetermined size, adapted to detect whether said flying bird is within a predetermined range of said aircraft, adapted to generate bird characteristics signals representative of said flying bird and adapted to transmit said flying bird characteristics signals to a digital processor;
   b. a threat evaluation sub-system comprising said digital processor and an algorithm implemented in said processor, said algorithm adapted;
      (1) to evaluate said flying bird characteristics signals;
      (2) to evaluate aircraft flight characteristics signals of said aircraft while in flight;
      (3) to determine a threat level associated with a risk of collision said flying bird with said jet engine;
      (4) to determine whether said threat level is greater than a predetermined threat level;
      (5) to generate control output signals if said threat level is greater than said predetermined threat level; and,
      (6) to transmit said control output signals to an active defensive mechanism;
   c. said active defensive mechanism attached on said aircraft and adapted to move from a retracted position to an extended position in front of said jet engine upon receipt of said output control signals, and, wherein said active defensive mechanism includes an inflatable bag made of an aramid mounted on said jet engine and adapted to extend from an un-inflated condition to an inflated condition upon activation of said defensive mechanism and then to extend momentarily in front of said jet engine.

2. The system of claim 1 wherein said inflatable bag is anchored to said jet engine at two points, on approximately opposite sides of said jet engine.

3. A jet engine protection system for an aircraft having a high-bypass ratio turbofan jet engine, said engine having a nacelle, a nacelle cowling, and a nacelle lip extending circumferentially around said nacelle, comprising:
   a. a sensor sub-system positioned on said aircraft, adapted to scan an area of interest in front of said aircraft, adapted to detect a flying bird having a size greater than a predetermined size, adapted to detect whether said flying bird is within a predetermined range of said aircraft, adapted to generate bird characteristics signals representative of said flying bird and adapted to transmit said flying bird characteristics signals to a digital processor;
   b. a threat evaluation sub-system comprising said digital processor and an algorithm implemented in said processor, said algorithm adapted
      (1) to evaluate said flying bird characteristics signals;
      (2) to evaluate aircraft flight characteristics signals of said aircraft while in flight;
      (3) to determine a threat level associated with a risk of collision said flying bird with said jet engine;
      (4) to determine whether said threat level is greater than a predetermined threat level;
      (5) to generate deployment control output signals if said threat level is greater than said predetermined threat level;

(6) to transmit said deployment control output signals to an active defensive mechanism;
(7) to generate retraction control output signals after transmission of said deployment control output signals and after said threat level is less than said predetermined threat level; and,
(8) to transmit said retraction control output signals to said active defensive mechanism; and,
c. said active defensive mechanism comprising:
(1) a set of streamlined rods housed inside of said nacelle cowling and spaced evenly about said nacelle lip;
(2) an actuator adapted to deploy said rods out in front of said engine upon receipt of said deployment control output signals from said threat evaluation sub-system;
(3) said rods configured and adapted to converge toward a point in front of said engine upon activations by said actuator; and,
(4) said active defensive mechanism adapted to retract said rods back within said nacelle cowling upon receipt of said retraction control output signals from said threat evaluation sub-system.

4. A method for protecting a jet engine from ingestion of foreign objects, including large birds, said engine being mounted on an aircraft, said engine being a high-bypass ratio turbofan jet engine, and said engine having a nacelle, a nacelle cowling, and a nacelle lip extending circumferentially around said nacelle, comprising:
a. providing a sensor sub-system positioned on said aircraft, said sensor sub-system:
b. scanning an area of interest in front of said aircraft during flight;
c. detecting a flying bird in said area of interest and said bird having a size greater than a predetermined size;
d. detecting whether said flying bird is within a predetermined range of said aircraft;
e. generating flying bird characteristics signals representative of said flying bird;
f. transmitting said flying bird characteristics signals to a digital processor;
g. providing a threat evaluation sub-system comprising said digital processor and an algorithm implemented in said processor, said algorithm:
h. evaluating said flying bird characteristics signals;
i. evaluating aircraft flight characteristics signals of said aircraft during flight;
j. determining a threat level associated with a risk of collision of said flying bird with said jet engine;
k. determining whether said threat level is greater than a predetermined threat level;
l. generating deployment control output signals if said threat level is greater than said predetermined threat level;
m. providing an active defensive mechanism comprising:
n. a set of streamlined rods housed inside of said nacelle cowling and spaced evenly about said nacelle lip;
o. an actuator adapted to deploy said rods out in front of said engine upon receipt of said deployment control output signals from said threat evaluation sub-system;
p. said threat evaluation sub-system transmitting said deployment control output signals to said active defensive mechanism actuator when said threat level is greater than said predetermined threat level;
q. said actuator causing said rods to move out of said nacelle cowling and to converge toward a point in front of said engine upon receipt of said deployment control output signals from said threat evaluation sub-system;
r. said threat evaluation sub-system generating retraction control output signals after transmission of said deployment control output signals and after said threat level is less than said predetermined threat level;
s. said threat evaluation sub-system transmitting said retraction control output signals to said active defensive mechanism; and,
t. said active defensive mechanism retracting said rods back within said nacelle cowling upon receipt of said retraction control output signals from said threat evaluation sub-system.

* * * * *